United States Patent

Bush et al.

[15] 3,684,833

[45] Aug. 15, 1972

[54] KEY TELEPHONE SYSTEM HAVING WIDEBAND CAPABILITY

[72] Inventors: Stanley E. Bush, Boulder, Colo.; Parker E. Crouse, Scottsdale, Ariz.; George E. Saltus, Boulder, Colo.

[73] Assignee: Bell Telephone Laboratories, Incorporated, Murray Hill, N.J.

[22] Filed: Nov. 10, 1969

[21] Appl. No.: 875,261

[52] U.S. Cl. ...............179/2 TV, 179/99, 179/27 FH

[51] Int. Cl. ........................H04m 11/08, H04m 1/00

[58] Field of Search.......179/2 TV, 2 DP, 99, 18.3 C, 179/18 AB, 27 FH, 18 F, 18 FF, 18 FG; 178/6 PD

[56] References Cited

UNITED STATES PATENTS

| | | | |
|---|---|---|---|
| 3,524,935 | 8/1970 | Gonsewski | 179/2 DP |
| 3,517,137 | 6/1970 | Ribner | 179/2 DP |
| 3,352,966 | 11/1967 | Sawazaki | 179/2 TV |
| 3,335,226 | 8/1967 | Michael | 179/2 DP |
| 3,061,670 | 10/1962 | Oster | 179/2 TV |
| 2,881,251 | 4/1959 | Strip | 179/2 DP |
| 2,828,362 | 3/1958 | Darwin | 179/2 DP |
| 2,314,471 | 3/1943 | Wright | 179/2 TV |
| 3,519,744 | 7/1970 | Dorros | 179/2 TV |
| 3,115,551 | 12/1963 | Plyer | 179/99 |
| 2,928,905 | 3/1960 | Kelnhofer | 179/33 |
| 2,186,242 | 1/1940 | Halligan | 179/31 |

OTHER PUBLICATIONS

Bell Laboratories Record, May/June 69, pp. 149– 153, Harris and Williams " Video Service for Business"

*Primary Examiner*—Kathleen H. Claffy
*Assistant Examiner*—Thomas D'Amico
*Attorney*—R. J. Guenther and James Warren Falk

[57] ABSTRACT

A key telephone system is arranged to provide wideband service to any number of stations served by the system. Wideband switches are associated with each station on a per-line basis and are arranged to function in conjunction with the associated station and with a line circuit common to all the stations to establish wideband connections selectively to any station. The switches on each line are connected such that wideband capability for that line is available only to one station at a time on a priority basis. The system is arranged such that a wideband connection may be made to a line only when at least one station associated with that line is available for such service.

11 Claims, 9 Drawing Figures

INVENTORS S. E. BUSH
P. E. CROUSE
G. E. SALTUS
BY David H. Hannenbaum
ATTORNEY

KEY TELEPHONE SYSTEM HAVING WIDEBAND CAPABILITY

BACKGROUND OF THE INVENTION

This invention relates generally to key telephone systems and, more particularly, to an arrangement for providing wideband service between any line and any key station.

DESCRIPTION OF PRIOR ART

Telephone subscribers, especially business subscribers, are becoming increasingly more aware of the communication possibilities inherently available in conjunction with their existing telephone facilities. Accordingly, it is anticipated that wideband service—an example of which is PICTUREPHONE video service—will form the nucleus of a communication network linking people and machines in an efficient and economical manner.

Unique problems are presented in such wideband systems when, as is the case with key telephone installations, more than one station has access to each line. For example, in a key telephone system arranged for PICTUREPHONE video service, it is possible for two or more video stations to become bridged across the same line with each station transmitting separate images. Since reconstruction of the received data at the terminating station is dependent upon the proper reception of synchronizing (sync) signals from the transmitting station and since these signals will be out of phase with each other when transmitted from different stations, a picture resulting from simultaneous transmission from two or more stations will be unintelligible.

In addition, since it is anticipated that a special charge in addition to the audio-only charge will be made for wideband connections, it is necessary that provision be made to ensure that such a connection will not be established unless at least one station equipped for wideband transmission is available to terminate the connection. One way of accomplishing this objective is to interrogate the called station from the switching network prior to connecting a call to that station. However, in key telephone systems, any one of a number of stations may terminate the call, some of which stations may be handling wideband calls on other lines, thereby making direct interrogation impractical.

In most wideband telephone installations the actual wideband facility, such as the PICTUREPHONE video set, is a separate physical unit from that of the station facility with which it is associated. In order to provide maximum convenience for the subscriber, it is desired that the wideband facility associated with a station become active automatically whenever the station becomes active. Under such a system, provision must be made to ensure that a wideband unit associated with a station does not become active until the subscriber at that station is ready.

In conventional key telephone systems the audio signals from all stations are combined at a line circuit common to all the stations and the actual transmission paths are controlled by the line pickup key at each station. However, in wideband systems special switching arrangements are necessary to ensure the integrity of the high frequency transmissions on each line. Accordingly, it is necessary to provide a switching arrangement where a wideband connection may be made from any one of a number of lines to a wideband facility associated with any one of a number of stations under control of the signals from that station.

Therefore, it is an object of this invention to provide a wideband key telephone system wherein any number of stations may have access to any number of lines without high frequency interference between the stations or between the lines.

It is another object of this invention to provide a wideband key telephone system wherein a wideband call to any line within the system will be completed only when at least one wideband station is available to terminate the connection.

It is still another object of this invention to provide a wideband key telephone system wherein wideband transmission paths may be established between a station and a selected line circuit in response to signals sent only from that station.

SUMMARY OF THE INVENTION

These and other objects are obtained in accordance with one exemplary embodiment of the invention wherein a key telephone system is arranged to provide each key station with access to both audio-only lines and wideband switching network lines while at the same time maintaining the degree of electrical isolation between the lines and between the stations required of high frequency wideband communication facilities.

In the embodiment, wideband switches are associated with each station on a per-line basis and are arranged to function in conjunction with the associated station and with a line circuit common to all the stations to establish wideband connections selectively to any station. The switches are arranged in a priority configuration such that only one associated station may receive or transmit wideband signals to the exclusion of all other stations on any line. The station having the highest priority on each line has access to the wideband connection upon the enabling of the pickup key at that station associated with that line. Stations having lower priority only have access to the wideband connection when all stations having a higher priority are idle. The wideband switches are arranged to provide terminations for the transmit and receive transmission paths when the station is on "hold."

The system is arranged such that a wideband connection may be made to a line only when at least one wideband station associated with that line is available for such service. This feature is provided by the common line circuit which continuously monitors the wideband facility associated with each station connected to that line. The line circuit is arranged to transmit signals representing the availability of the monitored facilities to a cable equalizer control circuit interposed between the key system and the switching network. When there are no wideband facilities available, the cable equalizer responds by opening a loopback circuit, thereby providing a negative response to the switching network when the video channel is interrogated for bidirectional continuity prior to the completion of a connection thereto.

In order to prevent a wideband station from becoming active before a subscriber is ready—such as when a secretary places a wideband call for her boss—provision is made to control the wideband equipment at each station in response to the joint application of wideband supervisory signals from the switching network and the combined operation of the switchhook and a line pickup key at the station.

In accordance with one feature of the invention, a plurality of wideband switches are arranged in a priority configuration between a key telephone station and a switching network line in order to provide exclusive wideband service on that line for an enabled wideband station.

In accordance with another feature of the invention, a line circuit is arranged to function in conjunction with a wideband switch to establish and control video transmission paths from a key telephone station to a switching network.

In accordance with still another feature of the invention, a line circuit common to a group of wideband stations is arranged to monitor the wideband facilities at each of the associated stations and to inhibit the termination of a wideband connection to that line when the facilities are unavailable for video service.

DESCRIPTION OF THE DRAWING

The foregoing objects, features and advantages, as well as others of the invention, will be more apparent from the following description of the drawing, in which.

It will be noted that FIGS. 2 through 8 employ a type of notation referred to as "detached contact" in which an "X" shown intersecting a conductor represents a normally open contact of a relay and a bar shown intersecting a conductor at right angles represents a normally closed contact of a relay; "normally" referring to the unoperated condition of the relay. The principles of this type of notation are described in an article entitled "An Improved Detached Contact Type Schematic Circuit Drawing" by F. T. Meyer in the Sept. 1955 publication of the American Institute of the Electrical Engineers Transactions, Communications and Electronics, Vol. 74, pages 505–513.

Figure 2:
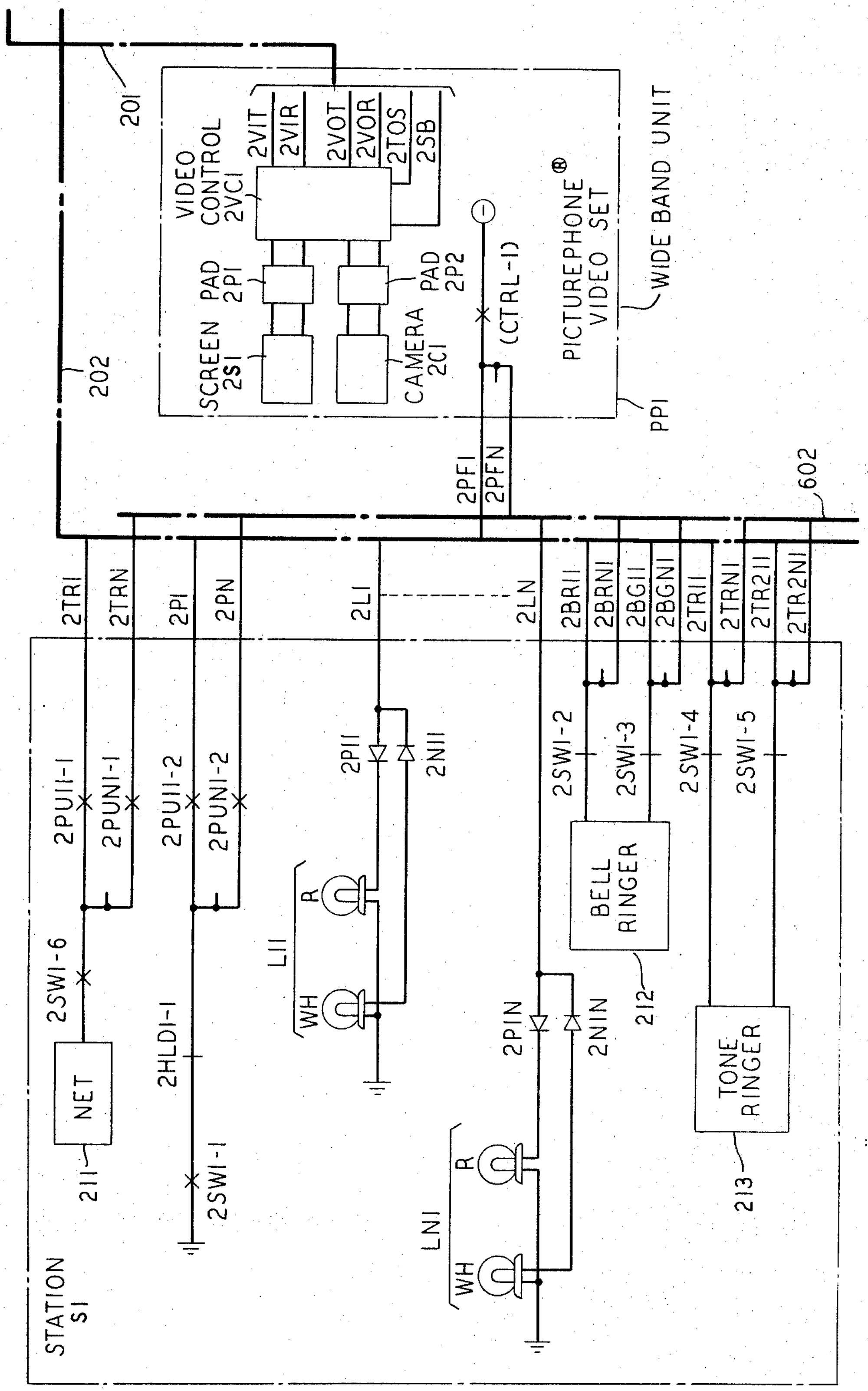
FIGS. 2 through 8 are schematic drawings showing in greater detail the interrelation of the components of the exemplary embodiment.
Figure 3:
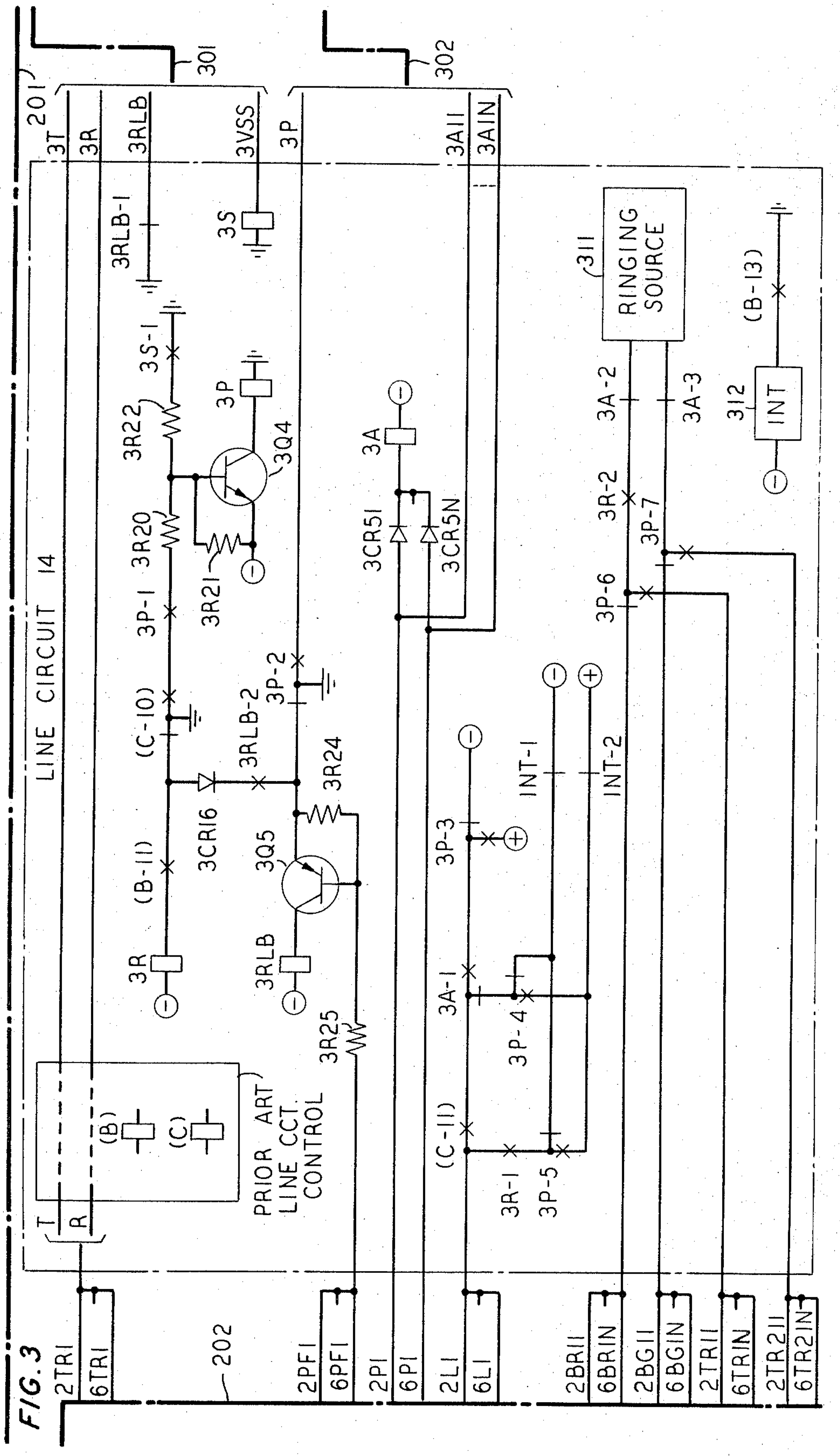

It will be noted also that in order to simplify the disclosure and thus facilitate a more complete understanding of the embodiment, the relays, relay contacts and other electromechanical devices shown in FIGS. 2 through 8 have been given systematic designations. Thus, the number preceding the letters of each device correspond to the figure in which the control circuit of the device is shown. Thus, the coil of relay 3RLB is shown in FIG. 3. Each relay contact, either make, break, or transfer, is shown with its specific contact number preceded by the designation of the relay to which it belongs. For example, the notation 3RLB-1 indicates contact number 1 of relay 3RLB, the coil of which is shown in FIG. 3.

INTRODUCTION

The present invention is illustrated in a key telephone system wherein any key station may be selectively connected to any one of a number of switching network lines in response to the enabling of a key associated with that line. For purposes of illustration, it is intended that audio-only connections and the audio portion of wideband connections are completed to the key stations from Private Branch Exchange (PBX) or Central Office (CO) lines in a manner well known in the art. One such arrangement is disclosed in the H. T. Carter U.S. Pat. No. 2,850,579, issued Sept. 2, 1958. It will be assumed that the high frequency or data portion of a wideband connection is completed over a wideband quad which consists of a transmit pair of wires and a receive pair of wires. It will further be assumed that prior to the completion of a connection involving a wideband line the switching network performs a bidirectional continuity test on the associated wideband quad to ensure that the wideband facilities associated with that quad are available for wideband service. Upon successful completion of the continuity test, the switching network transmits a supervisory signal over the tested quad to the key system. The called line is thereupon signaled from the switching network in the manner well known in the art via the audio pair or via auxiliary supervisory leads associated with the audio pair.

In order to further facilitate an understanding of the invention, the description of the operation of the exemplary embodiment has been subdivided into a general description portion designated 1.00 and a detailed description portion designated 2.00. Section 1.00 and its subsections describe the invention in general terms with respect to FIG. 1. Section 2.00 and its subsections describe the invention in detail with respect to FIGS. 2 through 8.

1.00 GENERAL DESCRIPTION

Figure 1:
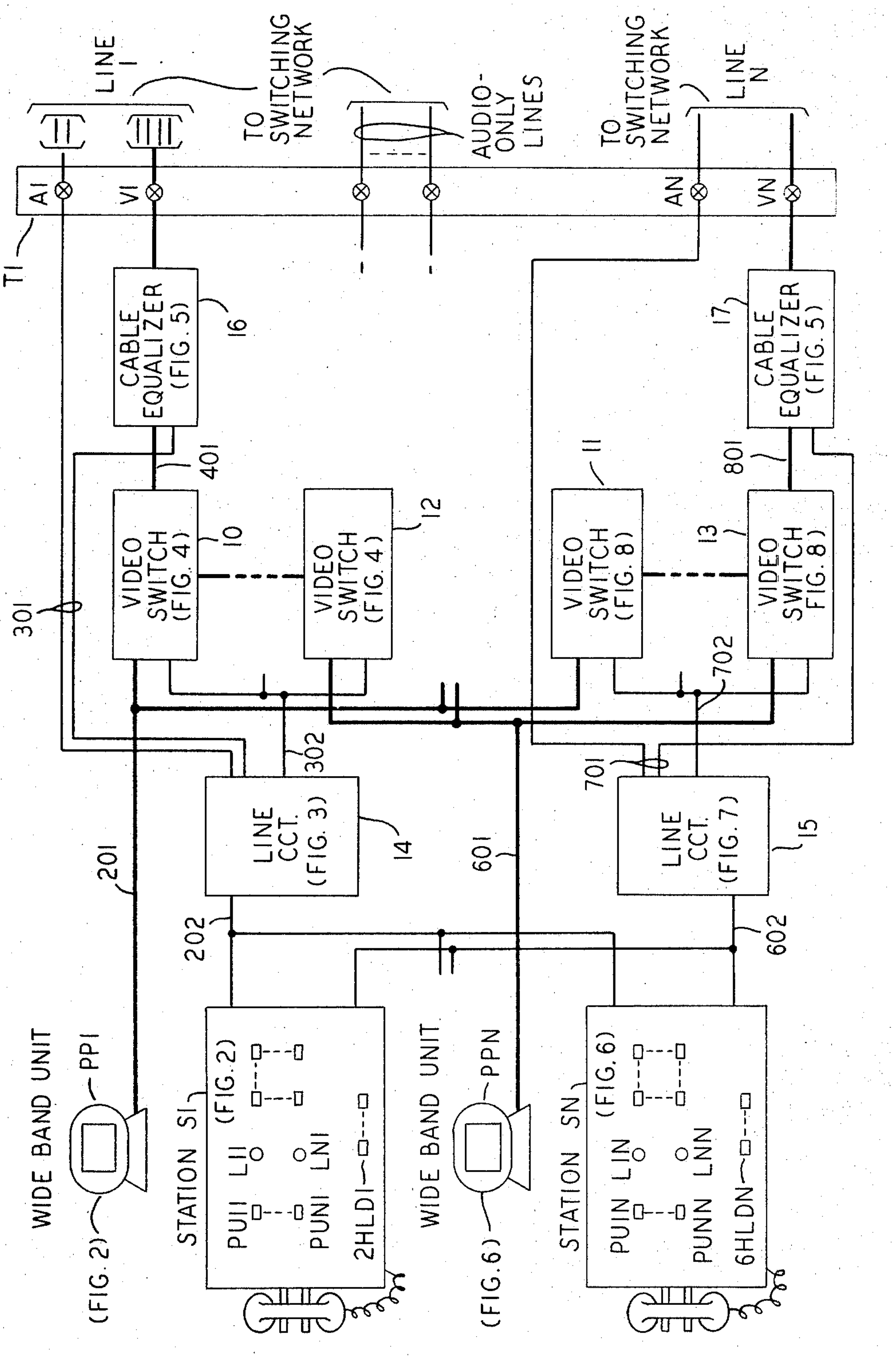
FIG. 1 is essentially a block diagram showing the interrelation of the exemplary embodiment of the invention.

Referring now to FIG. 1, the present invention is illustrated in an audio-video key telephone system having key stations S1 through SN. The wideband units PP1 through PPN, which in the embodiment are PICTUREPHONE video sets, are each individually associated with certain ones of the stations. Each line is associated with a line circuit, such as line circuit 14, which is common to all the stations associated with that line.

Audio connections to the key telephone system are made from a PBX switching network or from a central office switching network over a two-wire audio pair which is extended through terminal T1 to the associated line circuit and via the line circuit to any station. For example, the audio pair of line 1 from the switching network is connected to line circuit 14, while the audio pair from line N is connected to line circuit 15. The video quad of each line passes through a cable equalizer, such as cable equalizer 16, and is connected to a video switch, such as video switch 10, associated with the station having the highest priority on that line. The video switches associated with each line are arranged in a priority configuration to provide video service to every station equipped therefor on each line. For example, the video quad of line 1 is controlled by video switch 10, thereby, in the manner to be more fully detailed hereinafter, providing station S1 and wideband unit PP1 with the highest priority for connections involving line 1. The video quad of line N is controlled by video switch 13, thereby providing station SN and wideband unit PPN with the highest priority on video calls involving line N.

When it is desired to establish an audio connection to a line from a station, either for the initiation or for the reception of a call, the pickup key at that station associated with the desired line is enabled. Accordingly, a transmission path is enabled from the enabling station, through the enabled pickup key, and through the associated line circuit to the switching network. On video connections initiated from a station, the number key on a TOUCH-TONE dialer is enabled prior to the dialing of the station number of the called station. In such a situation, or when a video connection is to be terminated at a station the video switch associated with that station responds to wideband supervisory signals from the switching network and to the audio pickup signals from the station to enable a wideband connection from the PICTUREPHONE video set associated with that station through all the idle higher priority video switches to the video quad associated with the selected line. When a video connection is in progress on a line, a lower priority station can only bridge the connection audibly, video service being denied in such a situation.

The cable equalizer control circuit which is serially inserted between the switching network line and the associated video switch is arranged to provide constant video signal transmission parameters regardless of the variations between the respective distances of each key station and the switching network. In addition, as will be more fully detailed hereinafter, the cable equalizer responds to signals from the associated line circuit to provide the switching network, upon interrogation therefrom, with information regarding the availability of the PICTUREPHONE equipment of the key telephone system.

In order for a subscriber at a key station to distinguish between audio-only connections and video connections, two distinct signalling systems are utilized. On audio-only calls the visual signals are provided by a white line lamp and the audible signals are generated by a bell ringer. On video calls the visual signals are provided by a red line lamp and the audible signals are generated by a tone ringer.

2.0 DETAILED DESCRIPTION

The following text will describe the embodiment of the invention in detail with reference to FIGS. 2 through 8. Cursory examination of these figures will reveal that certain relay contacts and relay designations have been enclosed in parentheses.

The parenthetical symbol has been employed to facilitate a clear understanding of the invention by indicating that the apparatus which is enclosed therein is shown more fully in the prior art key telephone systems, such as R. E. Barbato et al. U.S. Pat. No. 3,436,488, dated Apr. 1, 1969. Relay designations and contact designations which are unique to the instant embodiment are not enclosed in parentheses and are shown in complete detail.

We shall assume as hereinbefore set forth that station S1 and station SN are each arranged for PICTUREPHONE service. We shall further assume that each of these stations is arranged to handle connections on line 1 or line N. However, as will be more apparent from that which is contained hereinafter, any number of stations may be connected into the key telephone system some of which may be arranged for audio-only connections while others may be arranged for video as well as audio terminations. Also, it should be pointed out that any number of audio-only or audio-video lines may be connected to the key telephone system each terminating at all or any number of stations.

2.1 LOOPBACK CIRCUIT CONTROL

Turning now to FIG. 2, let us assume that all stations and lines are idle. Accordingly, each wideband unit provides a battery on each of the associated PF- leads from an enabled make contact representing the internal circuitry of the video set and which contact is enabled whenever the video set is in service and functioning properly.

More specifically, with respect to the wideband unit associated with station S1; namely, video set PP1, enabled make contact (CTRL-1) provides a battery on lead 2PF1 which battery is extended, together with the batteries associated with all other functioning video sets, to FIG. 3 line circuit 14 via cable 202. For purposes of illustration, only the operation of one line circuit, line circuit 14, will be detailed herein since the operation of the line circuits associated with the other video lines functions exactly as does line circuit 14.

Accordingly, as shown in FIG. 3, battery on lead 2PF1 is extended through resistor 3R25 to the base of transistor 3Q5. Ground on the emitter of transistor 3Q5 from released break contact 3P-2 causes the transistor to conduct, thereby enabling relay 3RLB. Ground is thereby removed from lead 3RLB via now enabled break contact 3RBL-1. Lead 3RLB is extended via cable 301 from line circuit 14 to FIG. 5 loopback circuit 501 in cable equalizer 16.

Figures 5, 9:
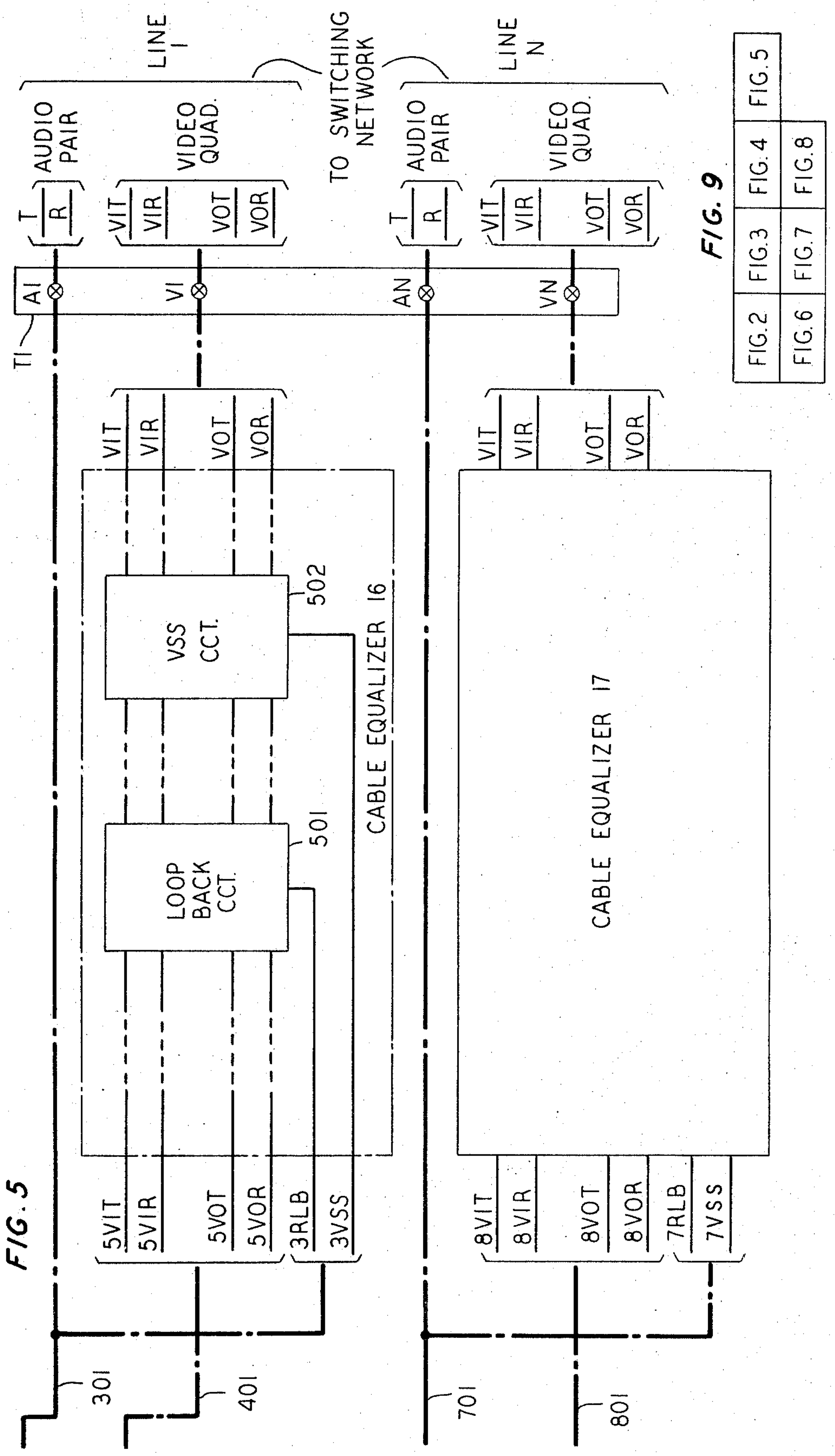
FIG. 9, which is shown in conjunction with FIG. 5, shows the manner in which the other figures should be arranged.

Continuing now in FIG. 5, loopback circuit 501 is arranged in any one of the well-known circuit configurations to provide electrical signal continuity between a first pair of wires and a second pair of wires when ground is absent from an input lead, such as lead 3RLB. The loopback circuit is further arranged to remove the electrical continuity when ground is present on that lead. Accordingly, since at this point at least one wideband unit is available to terminate wideband connections, ground has been removed from lead 3RLB of cable 301 in the manner set forth above and loopback circuit 501 now provides electrical signal continuity between leads VIT, VIR and leads VOT, VOR of cable equalizer 16. In similar fashion electrical signal continuity is provided between the input and output leads of each of the other cable equalizers associated with each of the other wideband lines.

2.2 INCOMING WIDEBAND CALL — LINE 1

Assume now that a wideband call is incoming to the key telephone system over line 1 from the switching network. Accordingly, as well known in the art, the switching network compares the class of service of line 1 with the class of service assigned to wideband lines to determine whether line 1 is equipped for such service. In addition, as discussed previously, on wideband calls even when such a comparison is affirmative a bidirectional continuity test is performed on the wideband quad from the switching network to the wideband unit associated with the called line. The bidirectional test consists primarily of the transmission of a distinctive signal over one pair of the wideband quad and the detection of that signal as returned through the associated wideband unit on the other pair of the quad. However, as discussed hereinbefore, since in a key telephone system any one of a number of wideband units may terminate wideband calls, with each unit located at a different distance from the switching network, it has been found necessary to terminate the incoming wideband quad at a cable equalizer, such as cable equalizer 16, located between the switching network and the key telephone stations.

Turning again to FIG. 5, as set forth previously, since at least one wideband unit is available for wideband service, loopback circuit 501 provides electrical continuity between the wideband pairs thereby satisfying the bidirectional continuity test performed by the switching network.

Digressing momentarily, it should be noted at this point that the cable equalizers on each line are located at a fixed distance from the switching network thereby maintaining a constant transmission level between the associated line and the switching network. In addition, as shown in FIG. 2, transmission pads, such as pad 2P1 and 2P2 are inserted in the transmit and in the receive pair in each wideband unit and adjusted so that the total transmission loss from the switching network to each unit is equal for all units. Constant transmission parameters are thereby maintained between all lines and all units regardless of the distance between any unit and the switching network.

Returning now to FIG. 5, the switching network, after receiving an affirmative response from the bidirectional test on line 1, applies a special wideband signal called a VSS signal over the wideband quad. This signal is detected by VSS circuit 502 which circuit may be arranged in any one of the well-known circuit configurations to provide a battery on an output lead when certain signals are present on the input leads. Accordingly, upon detection of VSS signals, VSS circuit 502 provides a battery over lead 3VSS and cable 301 to FIG. 3 thereby enabling relay 3S in line circuit 14.

Continuing in FIG. 3, the enabling of relay 3S provides a ground through enabled make contact 3S-1 and resistor 3R22 to turn on transistor 3Q4 thereby operating relay 3P. Relay 3P operating places relay 3RLB under exclusive control of released break contact (C-10) by removing enabling ground from now enabled break contact 3P-2. Enabled make contact 3P-2 provides a ground over lead 3P and cable 302 to FIG. 4 which ground is extended through diode 4CR11 to the winding of relay 4VS1 in video switch 10. This ground is also extended through released break contact 4VS1-5 and through all the break contacts of the intermediate video switches to video switch 12 and through diode 4CRN therein to the winding of relay 4VSN. Ground from lead 3P is also extended through each of the isolation diodes 4CR31 through 4CR3N in each of the video switches and over the respective SB leads to the associated wideband units. For example, in video switch 10 ground through diode 4CR31 is extended over lead 2SB and cable 201 to FIG. 2 and to video control 2VC1 in video set PP1. Video control 2VC1 is arranged in any one of the well-known circuit configurations to warm up the associated video set, when such warm up is necessary, upon the application of ground on a particular lead, such as lead 2SB. In addition, the video control circuit is further arranged to initiate signal transmission from camera 2C1 and signal reception to screen 2S1 upon the application of ground on another lead, such as lead 2TOS.

Summarizing briefly at this point, the switching network, prior to completion of a video call to line 1, tested the wideband portion of that line for bidirectional continuity. Upon satisfactory completion of that test the switching network proceeded to transmit VSS signals over the wideband quad of line 1. This signal was received by a VSS detector circuit in a cable equalizer associated with line 1 thereby operating a relay in a line circuit also associated with line 1 which line circuit is arranged in common with all the stations associated with that line. The line circuit thereupon transmitted a warmup signal to all wideband units associated therewith and also prepared an operate path for the control circuitry of each video switch associated with the wideband units and with line 1.

Continuing now with FIG. 3, upon satisfactory completion of the bidirectional test and after the application of VSS signals, the switching network transmits ringing signals over the T and R audio pair to the key telephone system. It should be noted that these signals are the same on wideband connections as on audio-only connections and may be transmitted from the switching network to the associated line in any manner well known in the art. Such signals may be transmitted over the T and R leads of the audio pair or may be transmitted over separate signal leads associated therewith. It will be assumed herein that upon application of ringing potential from the switching network relay (B) operates in line circuit 14 in the well-known manner as a result thereof. Accordingly, ground through released break contact (C-10) and now enabled make contact (B-11) enables relay 3R. Positive battery is thereupon extended through interrupter contact INT-2, which interrupter is turned on by ground through enabled make contact (B-13). Pulsating positive battery from contact INT-2 is extended through enabled make contacts 3P-5 and 3R-1 over lead 2L1 and cable 202 to FIG. 2 and through forward-biased diode 2P11 to flash the red lamp associated with line 1 at station S1. In similar manner, positive battery is extended to all the stations associated with line 1. Accordingly, at each of the stations S1 through SN associated with line 1 the red lamps associated with line 1 blink red to signify that a video call is incoming on that line.

Returning again to FIG. 3, the enabling of relay 3R also extends ringing potential from ringing source 301 through released break contacts 3A-2 and 3A-3, enabled make contact 3R-2 and enabled make contacts 3P-6 and 3P-7, over lines 2TR11 and 2TR211 and cable 202 to FIG. 2 station S1 and through the released switchhook contacts 2SW1-4 and 2SW1-5 to tone ringer 213. In similar manner the tone ringers of each of the other stations associated with line 1 are also enabled at this time to provide distinctive audible tones indicating that a video call is waiting termination.

Again returning to FIG. 3 and digressing momentarily it will be noted that had relay 3R operated on an audio-only call, relay 3P would have been normal. Under these conditions negative battery via interrupter contact INT-1 and released break contact 3P-5 would have been extended over lead 2L1 and cable 202 to FIG. 2 and to the line lamp in station S1. Accordingly, the white lamp associated with line 1 would now be flashing via diode 2N11 signifying that an incoming audio-only call is available for termination. In similar manner, as shown in FIG. 3, ringing potential would have been extended via released break contacts 3P-6 and 3P-7, over lead 2BR11 and 2BG11 to the bell ringer 212, FIG. 2, of station S1. Accordingly, each line circuit is arranged to respond to the joint application of VSS and audio signaling by providing a distinctive audible and visual signal to each station associated with that line when a video call is present.

2.3 STATION S1 ANSWERS INCOMING CALL ON LINE 1

Turning now to FIG. 2 it will be assumed that a subscriber at station S1, which station is arranged for wideband service, desires to answer the incoming call on line 1. In the manner well known in the art and as fully detailed in the above-cited Barbato et al. patent, the pickup key associated with line 1 at station S1; namely, pickup key 2PU11 is operated and the telephone network proper 211 is then moved off-hook. Accordingly, telephone network 211 is placed across the audio portion of the line by means of off-hook contact 2SW1-6 and pickup key contact 2PU11-1. Ringing is tripped at the switching network in the well-known manner at this point. The enabling of the pickup key at station S1 extends ground from enabled switchhook contact 2SW-1 and released break hold key contact 2HLD1-1 and enabled pickup key make contact 2PU11-2 and lead 2P1 over cable 202 to line circuit 14, FIG. 3, and through diode 3CR51 to operate relay 3A. Ground is also extended through the line circuit and over lead 3A11 and cable 302 to FIG. 4 video switch 10 associated with station S1 and line 1.

Figure 4:
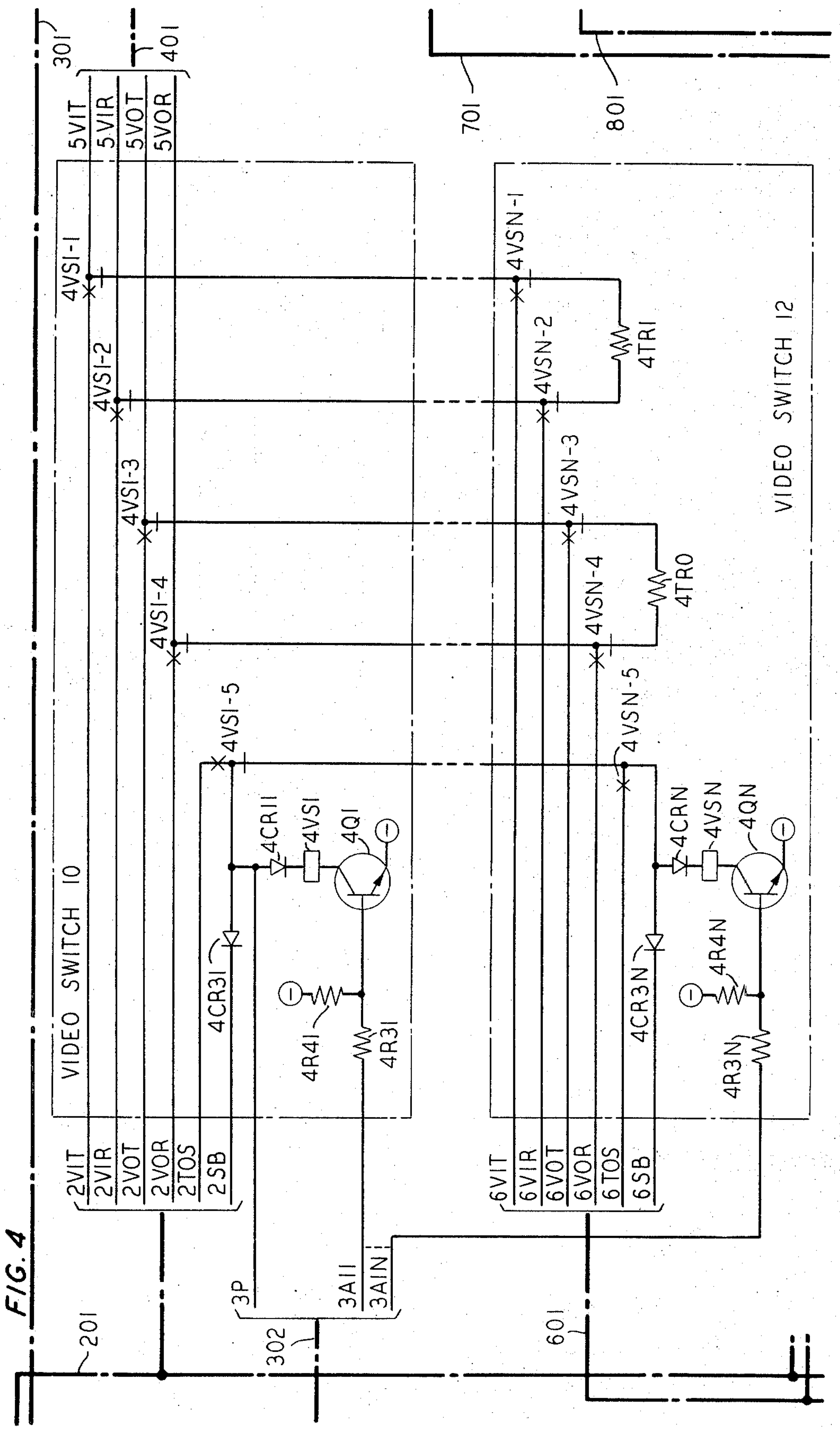

Continuing in FIG. 4, ground on lead 3A11 turns on transistor 4Q1 thereby enabling relay 4VS1 from battery through the transistor and through the relay coil to ground present on lead 3P. The ground on lead 3P is now extended through enabled make contact 4VS1-5 and over lead 2TOS and cable 201 to FIG. 2 to turn on video control 2VC1 thereby completing a transmission path through windband unit PP1 to the terminal elements, screen 2S1 and camera 2C1. A wideband transmission path is thereby extended from cable 401, FIG. 4, leads 5 VIT, 5VIR, 5VOT and 5VOR through now enabled make contacts 4VS1-1, 4VS1-2, 4VS1-3 and 4VS1-4 and video switch 10 output leads 2VIT, 2VIR, 2VOT and 2VOR over cable 201 to the terminal elements of video set PP1, FIG. 2.

Digressing again, as shown in FIG. 4, the video switches associated with line 1 are arranged in a priority configuration such that the wideband line from the cable equalizer via cable 401 will be extended through the enabled transfer contacts of the 4VS- relay associated with the switch arranged for highest priority. In our example relay 4VS1 in video switch 10 has been operated thereby extending the video connection to wideband unit PP1 associated with station S1. In the event that the line pickup key at any other station were to be operated at this point, such as line 1 pickup key at station SN, the 4VSN relay in video switch 12 associated with station SN would operate in the manner discussed above for relay 4VS1. However, a wideband connection would not be extended to the wideband unit PPN associated with station SN because of the enabled break contacts in higher priority video switch 10; namely, contacts 4VS1-1, 4VS1-2, 4VS1-3 and 4VS1-4. In addition, wideband unit PPN would not be turned on since ground from lead 3P is broken by enabled break contact 4VS1-5, which contact also removes the warmup signal from all wideband units except unit PP1.

It should be noted at this point that it is possible under this arrangement to configure the video switches of each line such that the station priorities for that line are different than on any other line. Review of FIG. 8 will show how this may be accomplished. As shown thereon, line N, via cable 801, is arranged to pass first through video switch 13 which is associated with station SN and then to pass through all intermediate switches before terminating at video switch 11 associated with station S1. Accordingly, under such a configuration, wideband connections involving line N would be completed with descending station priorities from station SN through S1.

In addition, it should be noted that as shown in FIG. 3 isolation diodes 3CR51 through 3CR5N are each associated with an individual one of the stations connected to line 1 so as to permit the audio control signals received from the respective stations to each enable the 3A relay which relay is shared in common with all the stations associated with the same line. Accordingly, the common 3A relay is operated from signals from all stations while the signals are separately maintained for the control of the wideband video switch associated exclusively with that station. Accordingly, wideband connections from any station to any line will be completed from that station only upon audio control signals therefrom even though any station may initiate audio connections on that line.

Turning again to FIG. 3, the enabling of relay 3A enables relay (C) in the manner well known in the art. Ground is thereby removed from transistor 3Q5 via now enabled break contact (C-10) thereby releasing relay 3RLB. A ground from released break contact 3RLB-1 is thereupon extended over lead 3RLB and cable 301 to FIG. 5 thereby opening the loopback path across the video quad via now released loopback circuit 501 in the manner previously set forth. The release of loopback circuit 501 extends switching network line 1 video quad leads VIT, VIR, VOT and VOR through cable equalizer 16 and over leads 5VIT, 5VIR, 5VOT and 5VOR and cable 401 to FIG. 4 and through enabled video switch 10 and over leads 2VIT, 2VIR, 2VOT and 2VOR and cable 201 to FIG. 2 wideband unit PP1. Accordingly, a two-way wideband transmission path is now complete from the switching network to the terminal elements 2C1 and 2S1 of video set PP1. In addition, an audio path has also been extended from line 1, cable 301, FIG. 3, through line circuit 14 and over leads T and R to FIG. 2, via cable 202 to audio network 201 in station S1 associated with wideband unit PP1.

Figure 6:
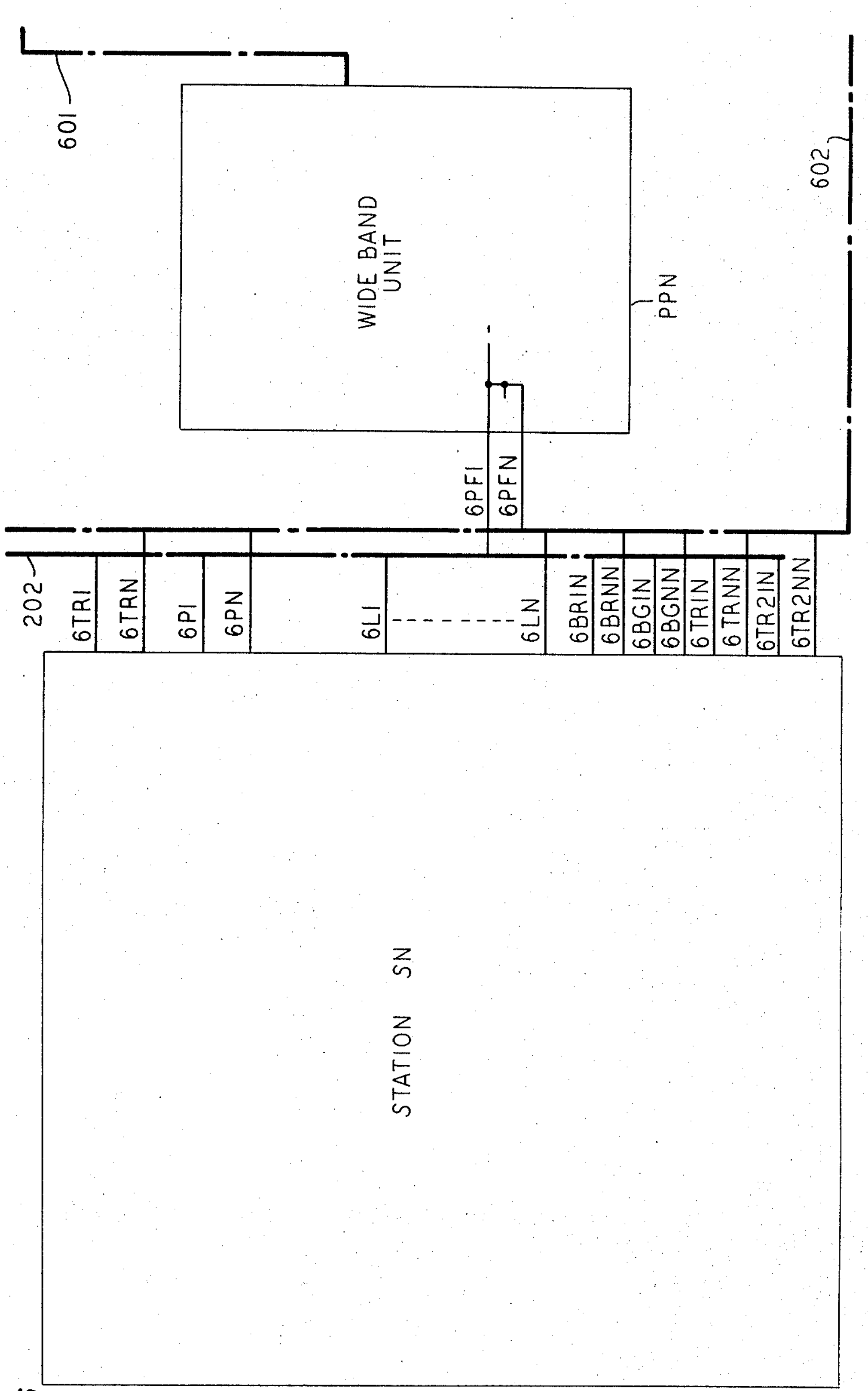
Figure 7:
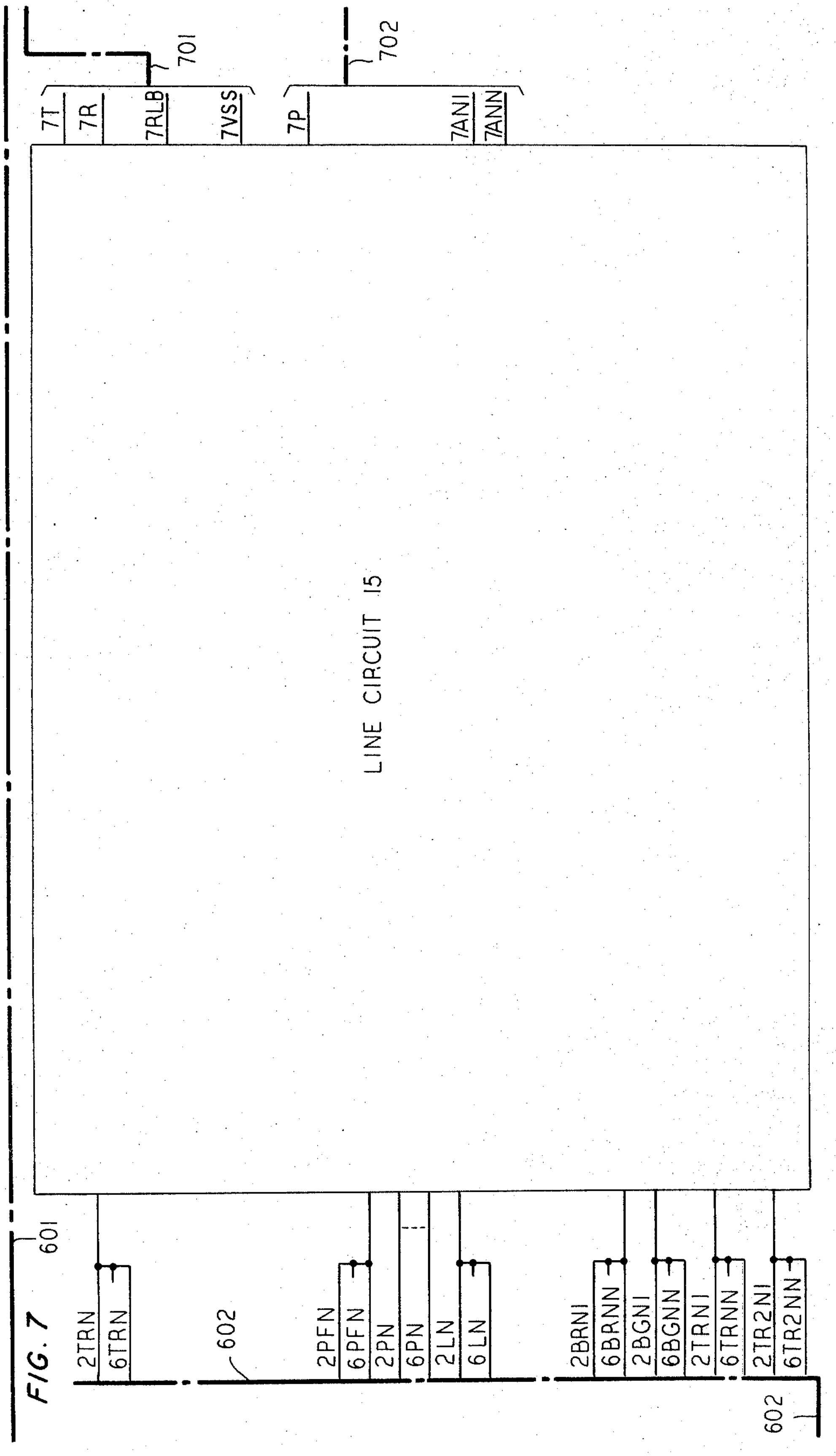
Figure 8:
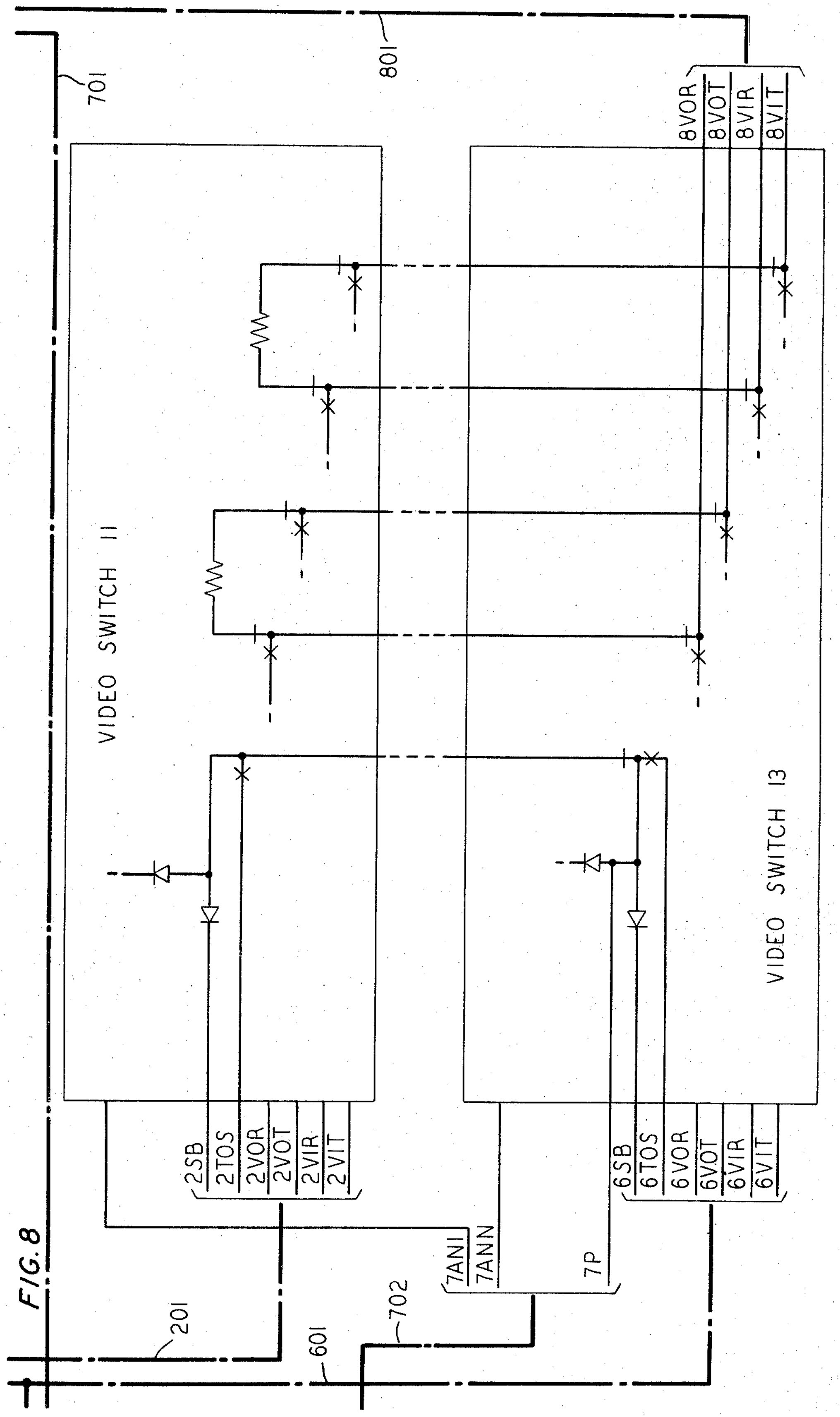

Returning again to FIG. 3, the enabling of relay (C) removes the holding ground for relay 3R via now enabled break contact (C-10) causing relay 3R to release. The flashing red signal, as well as the tone source, are thereupon removed from the signaling leads via released make contacts 3R-1 and 3R-2 respectively. The lamps associated with line 1 at each of the stations S1 through SN, FIGS. 2 and 6, are at this point maintained continuously illuminated red over positively biased line 2L1 and cable 202 from FIG. 3 enabled make contacts (C-11), 3A-1 and 3P-3 to positive battery.

2.4 STATION S1 PLACES CALL ON HOLD

Turning now to FIG. 2, assume that a subscriber at station S1 desires to place the wideband call on hold. Accordingly, the hold key is operated thereby removing ground from lead 2P1, cable 202, via now enabled break contact 2HLD1-1. Accordingly, as shown in FIG. 3, the removal of ground from lead 2P1 causes the release of relay 3A. Relay 3A releasing enables the operation of relay (B) in the well-known manner thereby opening the audio transmission path at the line circuit. Positive interrupted potential is thereupon extended via contact INT-2, enabled make contact 3P-4, released break contact 3A-1 and enabled make contact (C-11) over lead 2L1, over cable 202 to FIGS. 2 and 6 to flash the red lamps associated with line 1 at each station S1–SN.

In addition, the removal of ground from lead 2L1 causes the removal of ground from lead 3A11 in FIG. 3 which ground had been extended over cable 302 to FIG. 4 to operate relay 4VSI in video switch 10. Accordingly, relay 4VS1 releases at this point. Since there are no other video switches associated with line 1 operated, the break contacts of all the 4VS- video switch relays in the video chain are normal and the termination resistors 4TR0 and 4TR1 of video switch 12 are switched individually across each pair of the video quad via now released break contacts 4VSN-4, 4VSN-3, 4VSN-2 and 4VSN-1. Each pair of the wideband quad is thereby terminated at the key telephone system and wideband transmission is suspended.

At this point, the audio line is being held by the common line circuit in the well-known manner while the wideband quad is being held by the video switch terminating resistors 4TR0 and 4TR1. As shown in FIG. 3, relay 3RLB remains normal at this point due to released make contact 3RLB-2 since the relay coil controlling enabled break contact 3P-2 remains operated from enabled make contacts (C-10) and 3P-1, resistor 3R20 and transistor 3Q4. Ground is thereby maintained on lead 3RLB. Accordingly, loopback circuit 501, FIG. 5, which, as discussed previously, is controlled by ground on lead 3RLB continues to maintain the video quad free of loopback even though the call is on hold. This is necessary to prevent the wideband unit at the other end of the connection from receiving reflected transmission via the local loopback circuit. A wideband connection on line 1 may be returned active merely by the operation of the associated pickup key at any station associated therewith. Under these conditions a connection, both audio and video, will be extended to the enabling station. In the event the enabling station is not equipped for wideband service, only the audio portion of line 1 will be extended to that station while the video portion remains on hold. In this situation, the enabling of line 1 pickup key at a station which is equipped for video service will cause the video switch associated with that station to extend the video connection thereto exclusively. The audio portion of the connection will be bridged across the existing audio connection in the well-known manner.

2.5 CONCLUSION

While the equipment of the invention has been shown in a particular embodiment wherein a group of key telephone stations have been arranged for wideband connections, it is understood that such an embodiment is intended only to be illustrative of the present invention and numerous other arrangements may be devised by those skilled in the art without departing from the spirit and scope of the invention.

For example, the wideband sets may be replaced by a system of computers arranged for internally controlled selective readout such that upon interrogation from an outside source over a particular line the computers each respond sequentially according to a fixed priority. The priorities of the sequential response in the computers may be arranged on each line so that the output information is specifically tailored according to the interrogation line selected.

What is claimed is:

1. In a key telephone system wherein connections are established between any one of a number of wideband or audio-only lines and any one of a number of stations in response to the enabling of a key associated with a selected one of said lines at an enabling one of said stations, the combination comprising at least one wideband unit associated with at least one of said stations and associable with any of said wideband lines, means associated with each said wideband unit operable in response to the enabling of a key associated with any selected one of said wideband lines at a station associated with said wideband unit for enabling a wideband connection between said wideband unit associated with said enabling station and said one selected wideband line, and for concurrently enabling an audio connection to the audio portion of said wideband line, and means for inhibiting simultaneous wideband connections from more than one station to any one selected line while still enabling simultaneous audio connections from any number of stations to said selected line.

2. The invention set forth in claim 1 wherein said inhibiting means comprises means arranged to provide predetermined priority between said stations and any one of said lines on said wideband connections.

3. In a communication system wherein a wideband connection may be established from a switching network over a wideband line to a terminating station only after the wideband line between the switching network and the terminating station has been tested to determine the availability of that station for the termination of wideband connections and an affirmative response to said test returned to the switching network, the combination comprising a plurality of wideband units, each associated with one of said terminating stations, means common to all of said units for detecting the availability of said wideband units and for providing a signal whenever all said wideband units are unavailable, means interposed between said switching network and said wideband units and controlled by said detecting means for affirmatively responding to said switching network test, and means responsive to said signal from said detecting means for inhibiting said switching network test responding means.

4. The invention set forth in claim 3 wherein said interposed means further comprises means for providing constant transmission parameters on said wideband lines without regard to distance variations between each wideband unit and the switching network.

5. The invention set forth in claim 4 further comprising first visual and audible signaling means, means responsive to ringing signals transmitted from said switching network for enabling said first visual and audible signaling means, second visual and audible signaling means, means for detecting wideband signals transmitted over said wideband line from said switching network, and means jointly responsive to the enabling of said wideband signal detecting means and to said ringing signals for exclusively enabling said second visual and audible signaling means.

6. In combination a plurality of lines each including a line circuit, a plurality of telephone stations each arranged with line keys individually associated with certain of said lines, a plurality of wideband units individually associated with certain of said stations, a switching network for extending connections over said lines to said stations and to said wideband units, a control circuit coupled to each said line interposed between said switching network and said wideband units, means in each of said line circuits for ascertaining the availability of said wideband units, and means in each of said control circuits enabled by said ascertaining means for controlling said switching network to inhibit connections to said wideband units whenever no such wideband units are available.

7. The invention as set forth in claim 6 further comprising means in each of said line circuits responsive to the enabling of a key associated with one of said lines at any one of said connected stations for enabling an audio connection from said one station to said switching network over said one line, means associated with each line for detecting the transmission of a wideband synchronizing signal from said switching network over said associated wideband line, and means jointly responsive to the enabling of said detecting means on one of said lines and to the enabling of said key associated with said one line at one of said stations associated with a wideband unit for enabling a wideband connection from said associated wideband unit to said switching network over said one line.

8. The invention as set forth in claim 7 wherein said wideband connection enabling means comprises a plurality of wideband switches associated with each of said wideband units, each of said wideband switches individually associated with one of said lines, wherein said wideband switches associated with any one line are arranged to inhibit simultaneous connections involving said one line.

9. The invention as set forth in claim 8 further comprising means responsive to the enabling of a hold key at a connection enabling station for individually terminating said enabled audio and wideband connections.

10. In a key telephone system having a plurality of lines and a plurality of stations each station having a plurality of keys individually associated with one of said lines the combination comprising a plurality of video sets individually associated with certain of said stations each set operable for originating and receiving video signals;

means for detecting the presence of video signals on any of said lines;

means responsive to said detecting means for enabling distinctive signaling on each of said stations associated with said one line; and means jointly responsive to said detected video signal and to the enabling of said key associated with said one line at one of said stations for exclusively enabling the video set associated with said one station.

11. The invention as set forth in claim 10 further comprising means responsive to the unavailability of at least one of said video units associated with said line for inhibiting video signals on said line.

* * * * *